United States Patent
Nagai et al.

(10) Patent No.: US 11,268,906 B2
(45) Date of Patent: Mar. 8, 2022

(54) MICROSCOPE AND METHOD FOR OBSERVING BIOLOGICAL SPECIMEN IN LIVING STATE

(71) Applicant: Japan Science and Technology Agency, Kawaguchi (JP)

(72) Inventors: Takeharu Nagai, Suita (JP); Yoshiyuki Arai, Toyonaka (JP); Kazushi Suzuki, Yokohama (JP)

(73) Assignee: JAPAN SCIENCE AND TECHNOLOGY AGENCY, Saitama (JP)

( * ) Notice: Subject to any disclaimer, the term of this patent is extended or adjusted under 35 U.S.C. 154(b) by 94 days.

(21) Appl. No.: 16/133,867

(22) Filed: Sep. 18, 2018

(65) Prior Publication Data

US 2019/0017937 A1    Jan. 17, 2019

Related U.S. Application Data

(63) Continuation of application No. PCT/JP2017/011837, filed on Mar. 23, 2017.

(30) Foreign Application Priority Data

Mar. 23, 2016  (JP) .............................. JP2016-058946

(51) Int. Cl.
| | |
|---|---|
| *G01N 21/76* | (2006.01) |
| *G02B 21/06* | (2006.01) |
| *G02B 21/36* | (2006.01) |
| *G01N 21/75* | (2006.01) |

(52) U.S. Cl.
CPC ............. *G01N 21/76* (2013.01); *G02B 21/06* (2013.01); *G02B 21/36* (2013.01); *G01N 2021/751* (2013.01); *G01N 2021/757* (2013.01)

(58) Field of Classification Search
CPC ............. G01N 21/76; G01N 2021/757; G01N 2021/751; G02B 21/36; G02B 21/06
See application file for complete search history.

(56) References Cited

FOREIGN PATENT DOCUMENTS

| JP | 2008-057997 A | 3/2008 |
|---|---|---|
| JP | 2008057997 A | 3/2008 |
| JP | 2009069076 A | 4/2009 |

OTHER PUBLICATIONS

Kawano F. et al., "Fluorescence imaging-based high-throughput screening of Fast and Slow-cycling LOV proteins", PLOS One, 2013, vol. 8, issue 12, total pp. 1-8 (e82693. doi:10.1371/journal.pone.0082693). (Year: 2013).*
Hattori et al. "Sustained accurate recording of intracellular acidification in living tissues with a photo-controllable bioluminescent protein", Proceedings of the National Academy of Sciences of the United States of America, (Jun. 4, 2013), vol. 110, No. 23, pp. 9332-9337, XP055534415.
Takai et al. "Expanded palette of Nano-lanterns for real-time multicolor luminescence imaging", Proceedings of the National Academy of Sciences of the United States of America, Early Edition (Mar. 23, 2015), XP055518808.
Extended European Search Report dated Jan. 8, 2019, issued by the European Patent Office in corresponding European Application No. 17770372.5. (9 pages).
International Search Report (PCT/ISA/210) dated Jun. 27, 2017, by the Japan Patent Office as the International Searching Authority for International Application No. PCT/JP2017/011837.
Takai et al., "Expanded palette of Nano-lanterns for real-time multicolor luminescence imaging", Proceedings of the National Academy of Science, Apr. 2015, vol. 112 No. 14, pp. 4352-4356.

* cited by examiner

*Primary Examiner* — Satyendra K Singh
(74) *Attorney, Agent, or Firm* — Buchanan Ingersoll & Rooney PC

(57) ABSTRACT

A biological specimen containing a chemiluminescence substance that generates chemiluminescence is observed in a living state under a microscope. The microscope includes a light source that outputs control light that changes the state of the chemiluminescence, a defining unit that defines the radiation pattern of the control light with which an observation surface of the biological specimen is irradiated, and a detector that detects the chemiluminescence from the biological specimen.

13 Claims, 9 Drawing Sheets

MICROSCOPE AND METHOD FOR OBSERVING BIOLOGICAL SPECIMEN IN LIVING STATE

This application is a continuation of International Patent Application No. PCT/JP2017/011837 filed on Mar. 23, 2017, and claims priority to Japanese Patent Application No. 2016-058946 filed on Mar. 23, 2016, the entire content of both of which is incorporated herein by reference.

TECHNICAL FIELD

The present invention relates to a microscope and a method for observing a biological specimen in a living state.

BACKGROUND ART

In the related art, light emitted from a substance contained in a specimen has been observed under a microscope. For example, a fluorescence microscope of the related art allows observation of a specimen by irradiating a specimen with ultraviolet light, X-rays, or visible light to excite a substance in the specimen, and detecting fluorescence emitted from the substance when the substance in the excited state returns to the ground state. The fluorescence microscope of the related art therefore requires a light source that outputs excitation light for exciting the substance in the specimen.

In recent years, a microscope that requires no excitation light source has been introduced. A microscope of this type detects chemiluminescence generated in a substance contained in a specimen without irradiation of the substance with light from an excitation light source. PTL1 discloses that an area outside the area where Phrixothrix, which is a specimen, is observed is irradiated with erase light having a wavelength of 700 nm and an intensity of 400 mW to suppress the generation of the chemiluminescence in the area outside the observation area for high-sensitivity detection of the chemiluminescence generated in the Phrixothrix observation area under the microscope.

CITATION LIST

Patent Literature

PTL1: Japanese Patent Laid-Open No. 2008-57997

SUMMARY OF INVENTION

Technical Problem

The microscope for observing chemiluminescence described in PTL1 requires no excitation light source and therefore has a simple structure and is available at low cost. In the microscope described in PTL1, however, since the specimen is irradiated with the erase light having illuminance intense enough to instantly kill a cell in order to suppress the chemiluminescence in the area outside the observation area, the cell cannot be observed in the living state. For example, in a case where it is desired to observe the activity of a neural cell, specifically, to see a reaction of a specific one of a large number of protein molecules that form the cell, it is naturally required to observe the cell in the living state.

Therefore, an object of the present invention is to provide a microscope and a method that allow observation of a biological specimen in the living state with high sensitivity and at low cost.

Solution to Problem

A first aspect of the present invention is a method for observing a biological specimen in a living state, wherein the method comprises: an adding step of adding a luminescence substrate to the biological specimen containing a self-luminous fused protein that contains a luminescence enzyme and a fluorescent protein and generates chemiluminescence in cooperation with the luminescence substrate, and a luminescence control portion that is coupled with the luminescence enzyme and controls the chemiluminescence in accordance with whether or not the biological specimen is illuminated with control light that changes a state of the chemiluminescence; an illumination step of defining a radiation pattern of the control light and illuminating the biological specimen with the control light having the defined radiation pattern; and a detection step of detecting the chemiluminescence from the biological specimen.

A second aspect of the present invention is a microscope for observing a biological specimen in a living state, by using a method.

Advantageous Effects of Invention

The present invention can provide a microscope and a method that allow observation of a biological specimen in the living state with high sensitivity and at low cost.

DESCRIPTION OF EMBODIMENTS

First Embodiment

A first embodiment of the present invention will be described below with reference to the drawings.

[Chemiluminescence Substance]

Figure 4:
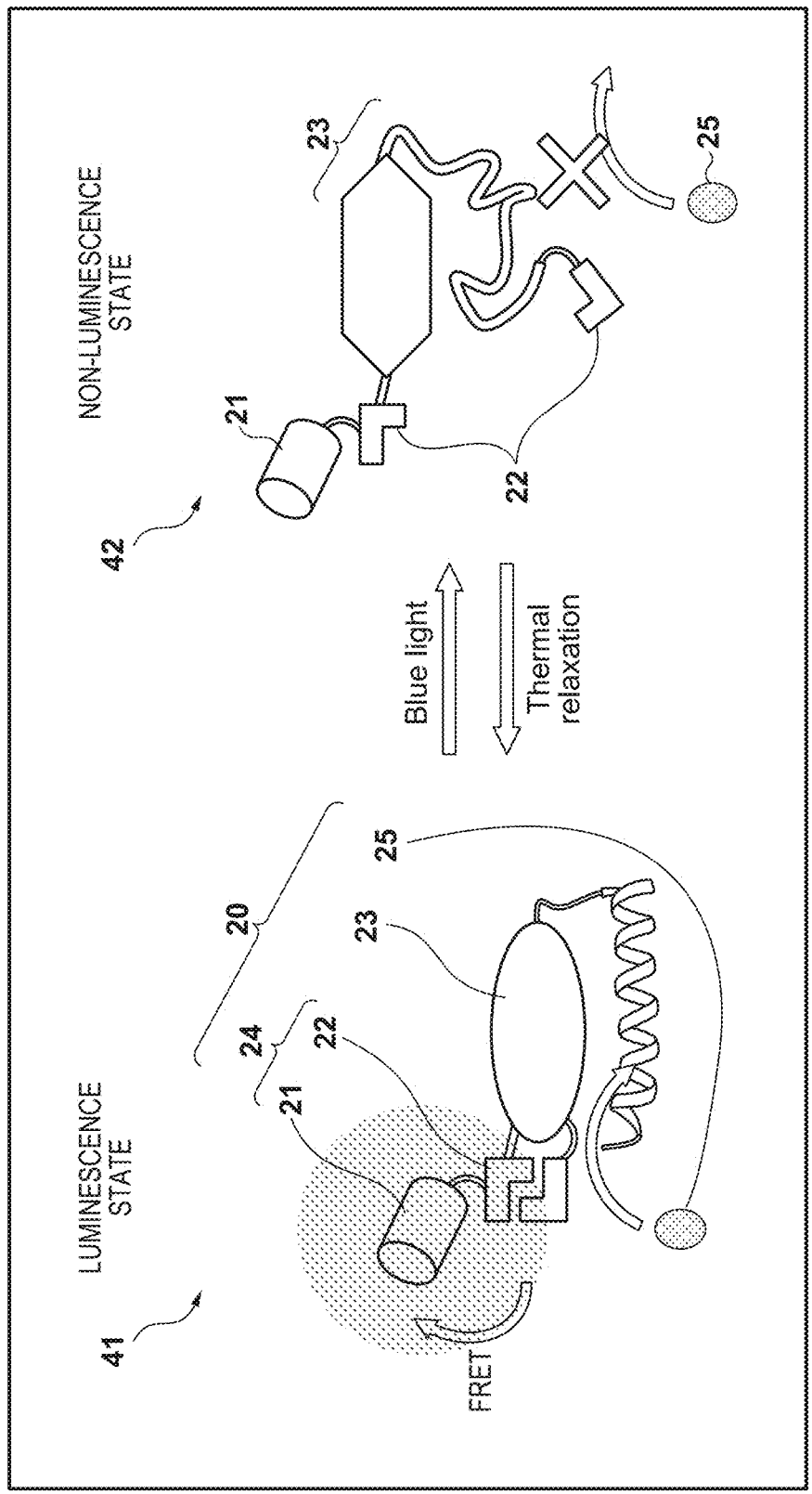
FIG. 4 describes a chemiluminescence substance.

A description will be given of a chemiluminescence substance that is contained in a biological specimen, such as a cell, and generates chemiluminescence. A chemiluminescence substance 20 used in the present embodiment is characterized in that the state of the chemiluminescence changes when the chemiluminescence substance is irradiated with control light, and, as shown in FIG. 4, the chemiluminescence substance 20 contains a luminescence substrate (luciferin) 25 and a self-luminous fused protein 24, which generates chemiluminescence in cooperation with the luminescence substrate 25. The self-luminous fused protein 24 contains a fluorescent protein 21 and a luminescence enzyme (luciferase) 22. When the luminescence enzyme 22 catalyzes the chemical reaction (oxidization) of the luminescence substrate 25, the chemiluminescence is generated.

When the fluorescence quantum yield of the fluorescent protein 21 is higher than the luminescence quantum yield of the luminescence enzyme 22, Förster resonance energy transfer (FRET) between the luminescence enzyme 22 and the fluorescent protein 21 increases the optical intensity of the chemiluminescence. The self-luminous fused protein 24, which contains the luminescence enzyme 22 and the fluorescent protein 21, is called a Nano-lantern, meaning a nano-scale light source that generates high-luminescence-intensity chemiluminescence.

In the present embodiment, the self-luminous fused protein (Nano-lantern) 24 can be at least one of a yellow Nano-lantern, a cyan Nano-lantern, an orange Nano-lantern, a green Nano-lantern, a red Nano-lantern, and modifiers thereof, each of which generates chemiluminescence having a wavelength (color) different from the others. Using a plurality of self-luminous fused proteins (Nano-lanterns) 24 that differ from one another in terms of color allows simultaneous observation of the behavior of a plurality of types of protein in a cell. For example, how three genes important for maintaining the pluripotentiality of a pluripotent cell (ES cell) are expressed can be simultaneously observed.

In the state in which the chemiluminescence substance 20 is not irradiated with the control light (state 41 in FIG. 4), a luminescence control portion 23 causes the self-luminous fused protein 24 to take a first three-dimensional structure that causes the chemiluminescence reaction to occur. On the other hand, in the state in which the chemiluminescence substance 20 is irradiated with the control light (state 42 in FIG. 4), the luminescence control portion 23 causes the self-luminous fused protein 24 to take a second three-dimensional structure that causes the chemiluminescence reaction not to occur. That is, the luminescence control portion 23 controls the chemiluminescence in accordance with whether or not the chemiluminescence substance 20 is illuminated with the control light. In the present embodiment, the control light is blue light having a wavelength ranging from 380 to 480 nm in the one-photon absorption scheme, or light having a wavelength ranging from 850 to 950 nm in the two-photon absorption scheme. When the self-luminous fused protein 24 is irradiated with the blue control light, the state 42, in which the chemiluminescence reaction does not occur, is achieved even in the presence of the luminescence substrate 25, and when the blue light radiation stops, thermal relaxation allows the self-luminous fused protein 24 to return to the state 41. The luminescence control portion 23 is, for example, a light-oxygen-voltage-sensing domain 2 (LOV2 domain) of Phototropin, LOV2-I427V, which is a variant of the LOV2 domain, an AppA domain (1-133) of a BLUF protein, a PapB domain (1-147) of the BLUF protein, or a YcgF domain (1-97) of the BLUF protein.

[Control Light]

A description will be given of the effect of the control light that controls the chemiluminescence generated by the chemiluminescence substance 20; that is, the chemiluminescence generated by cooperation between the self-luminous fused protein 24 and the luminescence substrate 25. As indicated by 51 in FIG. 5, an observation surface of a biological specimen is divided into a first area 7a, where generation of the chemiluminescence is allowed, and a second area 7b, where generation of the chemiluminescence is suppressed. The first area 7a is not irradiated with the control light, which suppresses generation of the chemiluminescence. On the other hand, the second area 7b is irradiated with the control light to suppress the generation of the chemiluminescence. The control light is donut-shaped light with which only the second area 7b, which has a donut-like shape that surrounds the first area 7a, is irradiated.

Figure 5:
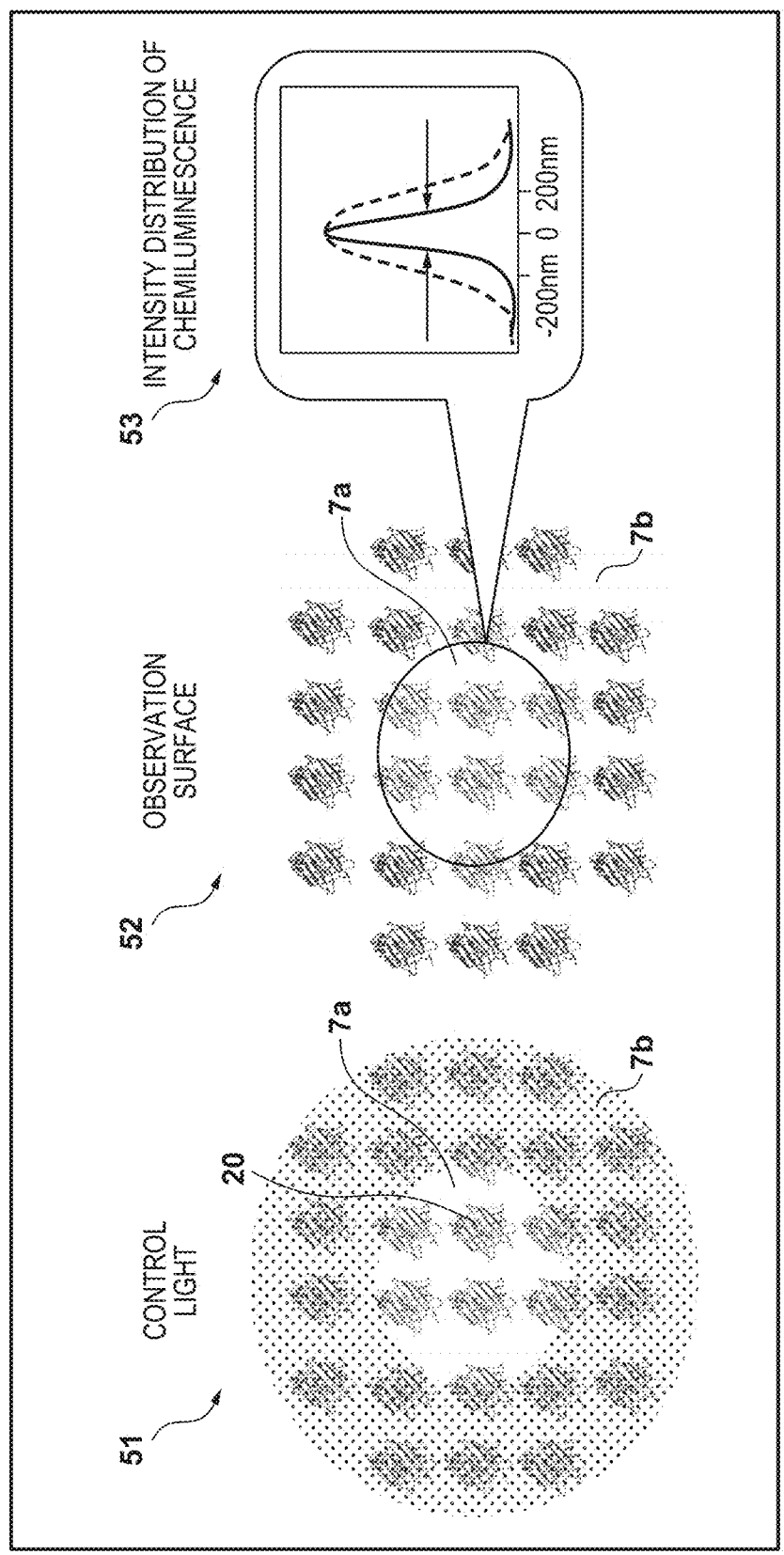
FIG. 5 describes the effect of control light.

The chemiluminescence is output from the first area 7a, but, as indicated by 52 in FIG. 5, the chemiluminescence is suppressed in the second area 7b, which surrounds the first area 7a. If no control light is used, the chemiluminescence is output from the entire observation surface; that is, both the first area 7a and the second area 7b, and, as shown by the dotted line indicated by 53, the intensity of the chemiluminescence observed across the observation surface of the biological specimen 7 under a microscope is broadly distributed. On the other hand, when only the second area 7b is irradiated with the control light, as shown by the solid line indicated by 53, only the chemiluminescence in the first area 7a is primarily observed, the intensity of the chemiluminescence is locally distributed. Use of the control light therefore increases the contrast of the chemiluminescence and improves the detection sensitivity. An image of the entire observation surface is produced by repeatedly changing the position of the first area 7a, where the chemiluminescence is generated, and detecting the chemiluminescence to acquire a large number of images and connecting the images to one another.

FIG. 5 shows a case where there is one first area 7a, which is irradiated with no control light. When there is a plurality of first areas 7a irradiated with no control light, a plurality of chemiluminescence phenomena in the plurality of first areas 7a can be simultaneously detected, allowing efficient detection. As described above, even in the case where a plurality of chemiluminescence phenomena in the plurality of first areas 7a is simultaneously detected, adjacent areas where two chemiluminescence phenomena are generated are sufficiently separated from each other, whereby the positions of the plurality of areas in each of which the chemiluminescence is generated can be accurately identified. The distribution of the first area 7a and the second area 7b across the observation surface is determined by a defining unit 4, which will be described later and defines the shape of the control light illumination. The diameter of the first area 7a can be about half the wavelength of the control light, provided that the optical system of the microscope has an NA of 1. In the present embodiment, the diameter of the first area 7a is set at about 50 nm, and the diameter of the second area 7b is set at about 250 nm.

The chemiluminescence substance used in the present embodiment contains the self-luminous fused protein 24, which includes the fluorescent protein 21 and the luminescence enzyme 22, and the luminescence control portion 23, such as the LOV2 domain and a variant thereof. The chemiluminescence can therefore be controlled by using the control light having very low intensity lower than or equal to 1 W/cm$^2$, preferably ranging from 18 mW/cm$^2$ to 1 W/cm$^2$. Since the degree of damage of the biological specimen 7 is therefore extremely smaller than that in the case of the microscope described in PTL1, employing the erase light intensive enough to instantly kill the biological specimen 7, specifically, the erase light having intensity on the order of KW/cm$^2$ to GW/cm$^2$, the biological specimen 7 can be observed in the living state. The control light used in the present embodiment is blue light having a wavelength ranging from 380 to 480 nm in the one-photon absorption scheme or light having a wavelength ranging from 850 to 940 nm in the two-photon absorption scheme.

[Microscope]

The microscope used to observe the biological specimen 7 in the living state will be described.

Example 1

Figure 1:
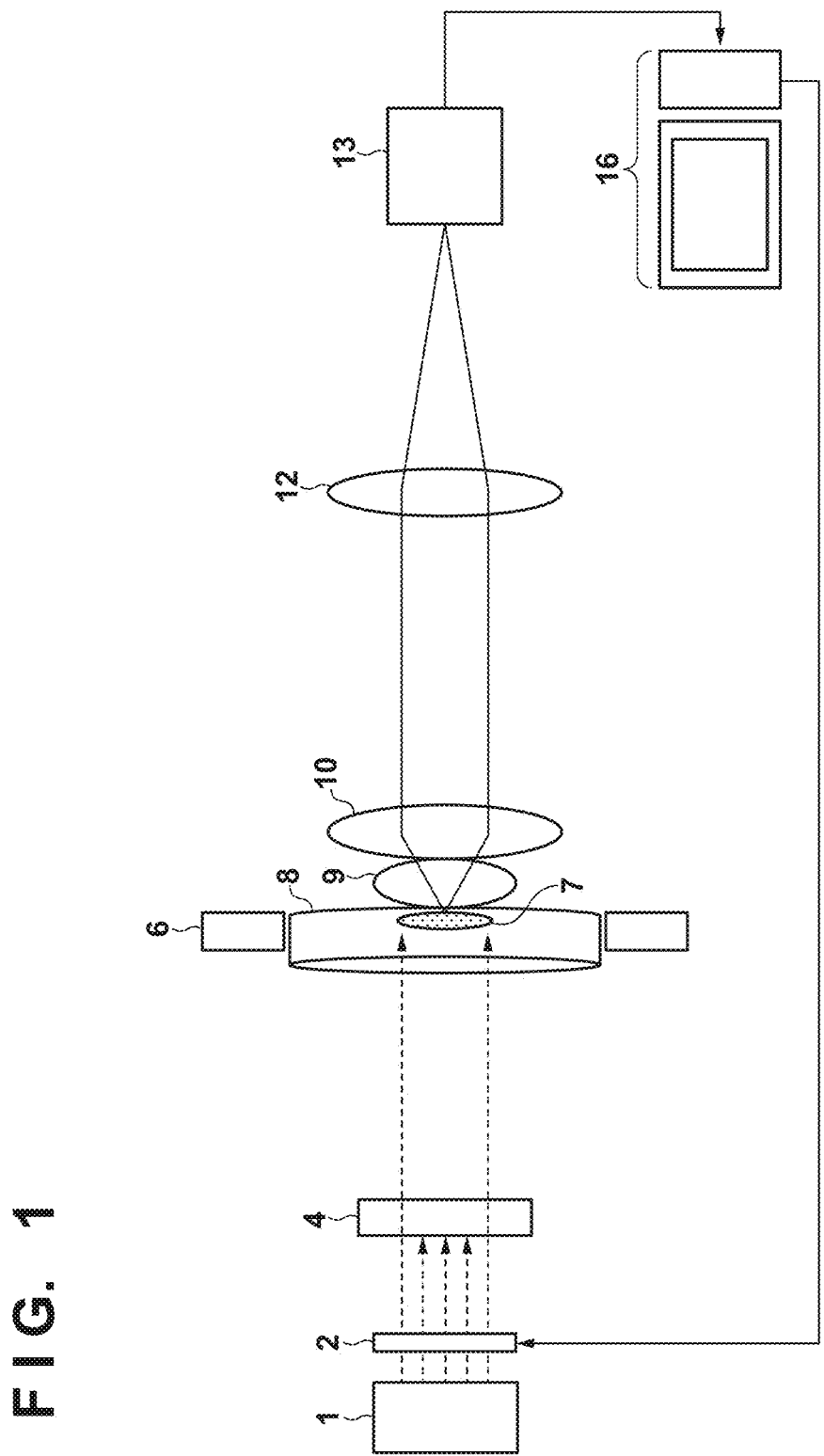
FIG. 1 shows a microscope of Example 1.

FIG. 1 shows a microscope in Example 1. A light source 1 outputs the control light, which suppresses generation of the chemiluminescence in the chemiluminescence substance 20 contained in the biological specimen 7. Since the intensity of the control light is 1 W/cm$^2$ or lower, which is very low intensity, the degree of damage of the biological specimen 7 is very small, and the biological specimen 7, which is an observation target, can be observed in the living state. A shutter 2 blocks and unblocks the control light toward the biological specimen 7. The defining unit 4 defines the shape of the control light (radiation pattern) with which the observation surface of the biological specimen 7 is illuminated in such a way that the first area 7a, where generation of the chemiluminescence is allowed and the chemiluminescence from the chemiluminescence substance 20 is to be detected, is not irradiated with the control light but the second area 7b, which surrounds the first area 7a and where generation of the chemiluminescence is suppressed, is irradiated with the control light. The control light is converted by the defining unit 4 into donut-shaped light having a donut-like shape. The defining unit 4 can, for example, be a vortex phase plate (helical-type phase plate), a spatial light modulator, or a transparent plate having a control light blocking material applied onto the portion corresponding to the first area 7a.

The biological specimen 7 is stored in a dish 8. The chemiluminescence is output from the first area 7a of the observation surface of the biological specimen 7 in the dish 8, the observation surface being located on the side opposite to the defining unit 4 (right side in FIG. 1), toward a detector 13. The dish 8, which stores the biological specimen 7, is held on a stage (holding bench) 6. The stage 6 is so provided as to be movable relative to the defining unit 4 in the direction perpendicular to the optical path of the control light (upward/downward direction in plane of FIG. 1). Repeatedly moving the stage 6 by a small amount in the upward/downward direction in the plane of FIG. 1, irradiating the specimen with the control light, and detecting the chemiluminescence therefore allow observation of the entire area of the observation surface of the biological specimen 7.

Although not shown, the microscope includes an adding unit that adds the luminescence substrate 25 to the biological specimen 7 in the dish 8 held by the stage 6. The adding unit drops the luminescence substrate 25 onto the biological specimen 7 or perfuses the luminescence substrate 25 in the biological specimen 7 to introduce the luminescence substrate 25 into the biological specimen 7. In a case where the luminescence substrate 25 is added to the biological specimen 7 in the dish 8 placed in a position outside the microscope and the dish 8 that stores the biological specimen 7 to which the luminescence substrate 25 has been added is placed on the stage 6, the adding unit, which adds the luminescence substrate 25, can be omitted.

Between the stage 6 and the detector 13 are disposed an objective lens 10, which parallelizes the chemiluminescence from the first area 7a, and an imaging lens 12, which focuses the parallelized chemiluminescence onto the detector 13. Further, a refractive index matching oil 9 for adjusting the refractive index is interposed between the dish 8 held on the stage 6 and the objective lens 10. The detector 13 detects the chemiluminescence from the first area 7a of the observation surface of the biological specimen 7, the observation surface being located on the side opposite to the defining unit 4 (right side in FIG. 1). In a case where the defining unit 4 is so configured that a plurality of two-dimensionally arranged first areas 7a is illuminated with the control light, the detector 13 is formed, for example, of an array detector in which detectors are two-dimensionally arranged to simultaneously detect the plurality of chemiluminescence phenomena. A processing unit (computer) 16 processes the result of the detection sent from the detector 13 to produce a chemiluminescence image.

Example 2

Figure 2:
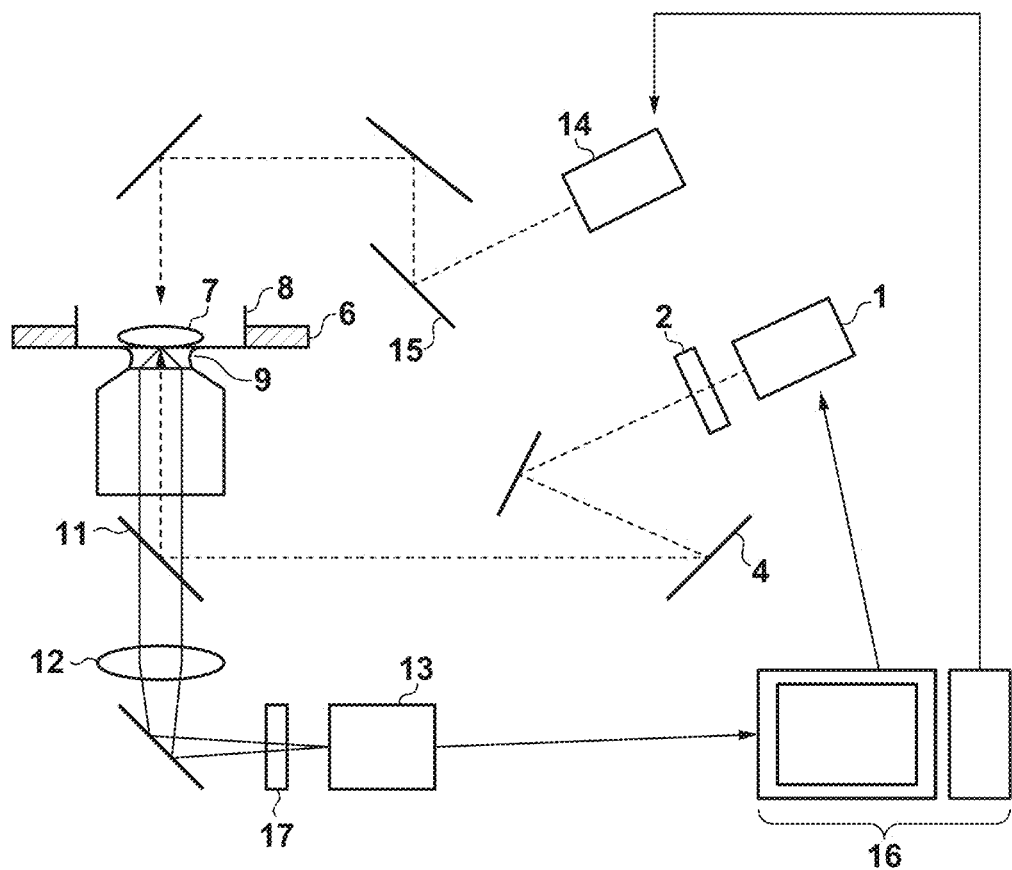
FIG. 2 shows a microscope of Example 2.

FIG. 2 shows a microscope according to Example 2. The microscope according to Example 2 has a basic configuration common to that of the microscope according to Example 1, and therefore only the following three configurational aspects different from those of the microscope according to Example 1 will be described.

In the microscope according to Example 1, the light source 1, which outputs the control light, and the detector 13, which detects the chemiluminescence, are so disposed as to sandwich the stage 6. In contrast, in the microscope according to Example 2, the light source 1, which outputs the control light, and the detector 13, which detects the chemiluminescence, are disposed on the same side with respect to the stage 6 (lower side in the plane of FIG. 2). The optical path of the control light from the light source 1, which outputs the control light, to the dish 8, which stores the biological specimen 7 and is held on the stage 6, therefore overlaps with the optical path of the chemiluminescence from the biological specimen 7 in the dish 8 to the detector 13. The microscope according to Example 2 therefore further includes a beam splitter 11, which is disposed between the light source 1, which outputs the control light, and the stage 6, guides the control light from the light source 1 toward the stage 6, and guides the chemiluminescence from the observation surface of the biological specimen 7 toward the detector 13.

The microscope according to Example 1 does not include a light source that outputs stimulation light that simulates the biological specimen 7. In contrast, the microscope according to Example 2 further includes a second light source 14, which outputs stimulation light that simulates the biological specimen 7, and a second defining unit 15, which defines the shape of the stimulation light illumination, for example, as a patterned shape. For example, in a case where optogenetics is conducted, the biological specimen 7 is irradiated with the stimulation light having the patterned shape through the upper surface of the biological specimen 7 in the transmitted illumination configuration. The light source 14, which outputs the stimulation light, can, for example, be an LED. The timing at which the stimulation light is radiated is set so as to fall within the dead time of the detector 13, so that the stimulation light does not leak to the detector 13 during the detection of the chemiluminescence. In this process, the stimulation light can be light different from the control light in terms of at least one of wavelength and intensity. For example, the stimulation light preferably has a wavelength ranging from 400 to 600 nm and an intensity ranging from 0.01 to 1 W/cm$^2$.

In the microscope according to Example 1, the biological specimen 7 contains one type of chemiluminescence substance 20. In contrast, in the microscope according to Example 2, a biological specimen 7 contains a plurality of types of chemiluminescence substances 20 that generate a plurality of chemiluminescence phenomena different from one another in terms of wavelength. For example, the biological specimen 7 contains at least two of a yellow Nano-lantern, a cyan Nano-lantern, an orange Nano-lantern, a green Nano-lantern, and a red Nano-lantern. To handle a plurality of chemiluminescence phenomena, the microscope according to Example 2 further includes a wavelength filter 17, which separates the plurality of chemiluminescence phenomena based on the wavelength. In the microscope according to Example 2, the detector 13 detects each of the chemiluminescence phenomena separated by the wavelength filter 17. Coupling each of a plurality of Nano-lanterns 24 different from one another in terms of color with each of a plurality of types of protein to be observed in the biological specimen 7 and using the microscope according to Example 2 allow simultaneous observation of the behavior of the plurality of types of protein under observation.

[Observation Method]

Figure 3:
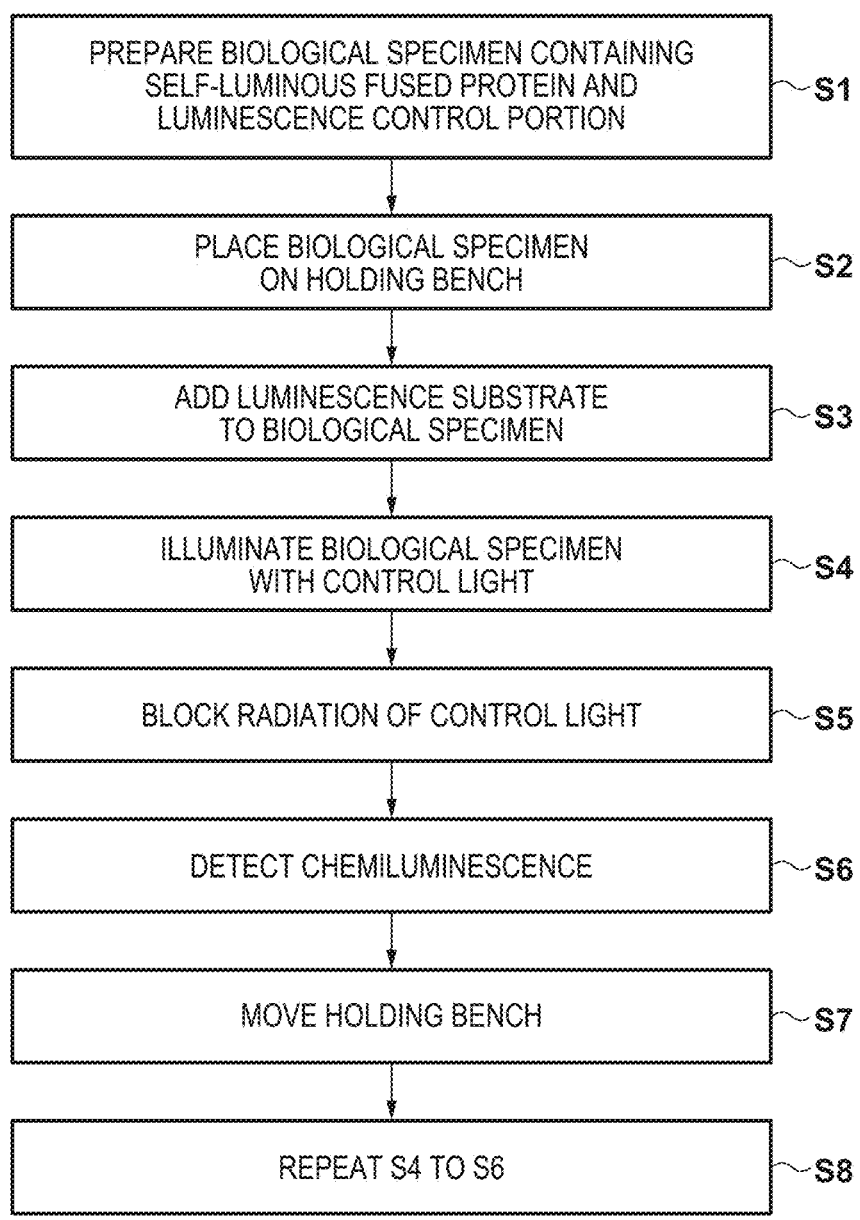
FIG. 3 is a flowchart for describing an observation method according to the present invention.

A method for observing the biological specimen 7 in the living state under the microscope according to Example 1 shown in FIG. 1 will be described with reference to FIG. 3. First, in step S1, the biological specimen 7 is prepared by adding a luminescence substrate to the biological specimen 7 containing a self-luminous fused protein that contains a luminescence enzyme and a fluorescent protein and cooperates with the luminescence substrate to generate chemiluminescence, and a luminescence control portion that controls the chemiluminescence in accordance with whether or not the biological specimen 7 is illuminated with the control light. Step S1 can be divided, for example, into the following sub-steps:

Sub-step 1: A biological specimen 7, such as a cell, biological tissue, or individual living body that expresses optical-switching chemiluminescence, is created.

Sub-step 2: The biological specimen 7 is cultured in a dish 8 made of glass and having a thickness suitable for observation through a high-NA objective lens.

Sub-step 3: In a case where the culture in the dish 8 uses a serum culture medium, the serum culture medium is replaced with a culture medium from which the serum is removed before the observation starts.

Next, in step S2, the dish 8 that accommodates the biological specimen 7 is placed on the stage 6 of the microscope. The stage 6 desirably has incubation function for cell incubation. In step S3, the luminescence substrate 25, coelenterazine, for example, is added to the biological specimen 7 (adding step). It is noted that the luminescence substrate 25 can be added to the biological specimen 7 located at a position outside the microscope; that is, during step S1. After step S2 or S3, observation under the microscope is prepared. For example, the biological specimen 7 is brought into focus under the microscope in bright field observation or fluorescence observation, or an autofocus apparatus for observation of the chemiluminescence is activated. In the present embodiment, since the self-luminous fused protein (Nano-lantern) 24 contains the fluorescent protein 21, fluorescence observation can be performed.

In step S4, the observation surface of the biological specimen 7 is so illuminated with the control light that the first area 7a, where generation of the chemiluminescence is allowed, is not irradiated with the control light but the second area 7b, which surrounds the first area 7a and where generation of the chemiluminescence is suppressed, is irradiated with the control light (illumination step). The control light is donut-shaped illumination with which only the second area 7b, which surrounds the first area 7a, is illuminated. The control light is cyan (blue) light having a wavelength ranging from 380 to 480 nm, which induces a change in the structure of the LOV2 domain, which is the luminescence control portion 23. The control light with which the biological specimen 7 is irradiated is not limited to the cyan (blue) light having a wavelength ranging from 380 to 480 nm in the one-photon absorption scheme and may be light having a wavelength ranging from 850 to 950 nm in the two-photon absorption scheme.

In step S5, the control light with which the biological specimen 7 is illuminated is blocked (blocking step). In step S6, in the state in which the biological specimen 7 is not illuminated with the control light and the LOV2 domain is not recovered, the chemiluminescence from the first area 7a of the biological specimen 7 is detected with the detector 13 (detection step). In a case where incidence of the control light on the detector 13 is blocked in the detection step, the blocking step S5 is unnecessary. In step S7, the stage 6 is moved in the direction perpendicular to the optical path of the chemiluminescence and the control light, and the position of the biological specimen 7 or the position of the first area 7a, from which the chemiluminescence is output, is changed (changing step). In step S8, the illumination step S4, the blocking step S5, and the detection step S6 are carried out in this order to observe a different first area 7a of the biological specimen 7. The illumination step S4, the blocking step S5, and the detection step S6 are then repeatedly carried out for each of a large number of first areas 7a of the biological specimen 7 to observe the entire area of the observation surface of the biological specimen 7.

In the present embodiment, the case where the biological specimen 7 containing the chemiluminescence substance 20, which suppresses the generation of the chemiluminescence when irradiated with the control light, is observed in the living state is presented by way of example. A chemiluminescence substance that allows generation of chemiluminescence or no generation thereof in accordance with radiation of the control light as described above is called an optical-switching chemiluminescence substance. Some optical-switching chemiluminescence substances that suppress generation of the chemiluminescence when irradiated with the control light, such as the chemiluminescence substance 20 used in the present embodiment, is called a positive chemiluminescence substance. A positive chemiluminescence substance contains a fluorescent protein, such as, Padron or Kohinoor, and when the positive chemiluminescence substance is irradiated with the control light, generation of the chemiluminescence is suppressed, resulting in a decrease in the intensity of the light emitted from the fluorescent protein.

Second Embodiment

Figure 6A:
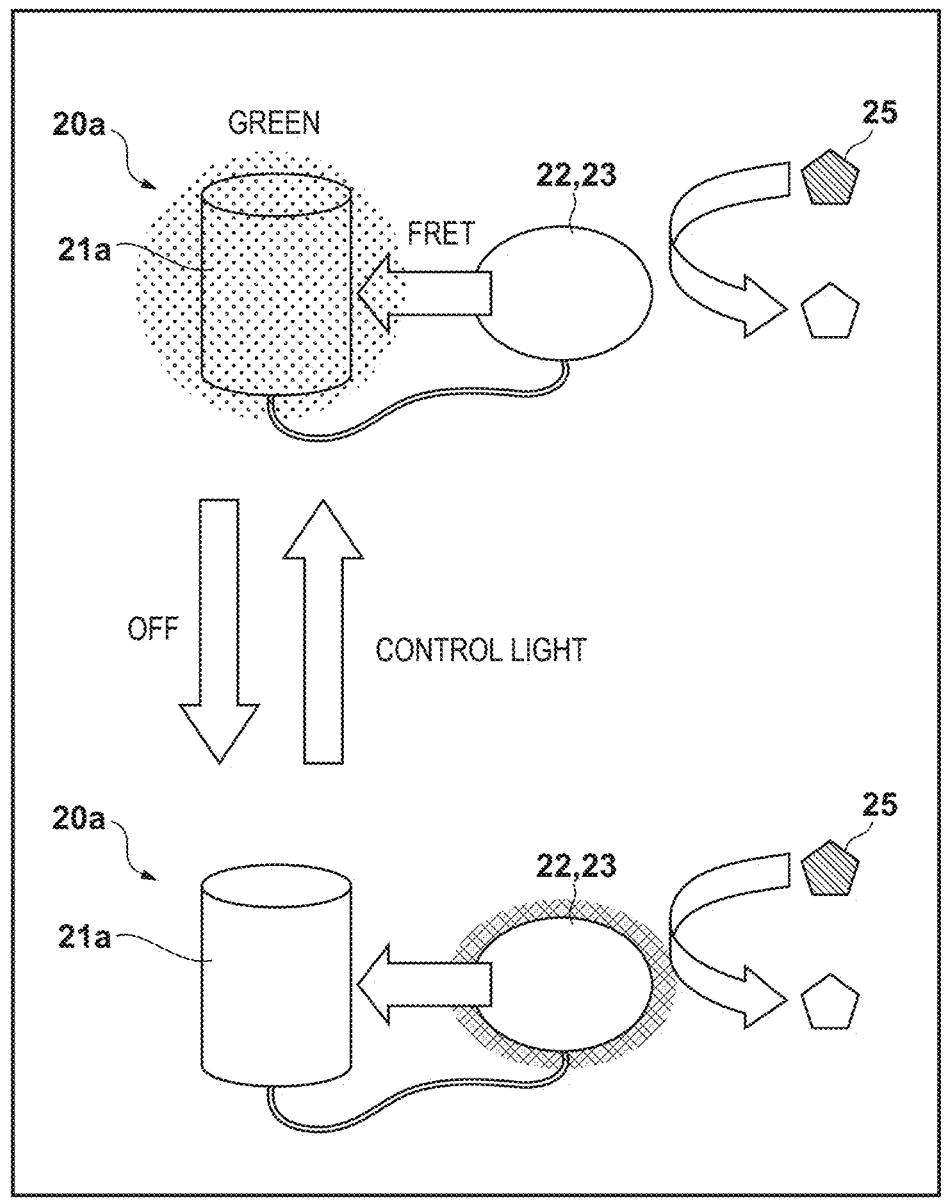
FIG. 6A describes a negative chemiluminescence substance.

In a second embodiment, a description will be given of a case where a biological specimen contains what is called a negative chemiluminescence substance, out of a number of optical-switching chemiluminescence substances, which facilitates generation of the chemiluminescence when irradiated with the control light. A negative chemiluminescence substance contains a fluorescent protein, for example, Dronpa, rsEGFP, Skylan, or rsTagRFP, and can facilitate generation of the chemiluminescence to increase the intensity of the light emitted from the fluorescent protein when irradiated with the control light. FIG. 6A shows a negative chemiluminescence substance 20a. FIG. 6A shows the luminescence enzyme 22 and the luminescence control portion 23 as a combined unit. Before the negative chemiluminescence substance 20a is irradiated with the control light (lower part of FIG. 6A), the luminescence enzyme 22 in the excited state undergoes Förster resonance energy transfer (FRET), which causes the energy of the luminescence enzyme 22 to move to a fluorescent protein 21a, so that generation of the chemiluminescence is suppressed. In this state, the negative chemiluminescence substance 20a is irradiated with the control light, which facilitates generation of the chemiluminescence and can therefore increase the intensity of the light emitted from the fluorescent protein 21a (upper part of FIG. 6A).

A description will next be given of a case where a biological specimen containing a negative chemiluminescence substance is observed under the microscopes shown in Examples 1 and 2 described above. To observe the biological specimen 7 containing a negative chemiluminescence substance, the defining unit 4 of each of the microscopes defines the radiation pattern of the control light with which the observation surface of the biological specimen 7 is irradiated in such a way that the area where the chemiluminescence from the chemiluminescence substance is to be detected (first area) is irradiated with the control light. For example, the control light is converted by the defining unit 4 into dot-shaped light with which only the area is irradiated. The contrast of the luminescence intensity between the area irradiated with the control light and the other area can thus be increased, whereby the chemiluminescence from the control light irradiated area can be detected with increased sensitivity. In a case where a plurality of areas where the chemiluminescence is to be detected is provided on the observation surface of the biological specimen 7, it is preferable that the defining unit 4 define a control light radiation pattern in which a plurality of dot light spots is arranged.

Third Embodiment

In a third embodiment, a description will be given of a case where a biological specimen contains what is called a decoupled chemiluminescence substance, out of a number of optical-switching chemiluminescence substances, which facilitates or suppresses generation of the chemiluminescence when irradiated with two types of control light different from each other. A decoupled chemiluminescence substance contains a fluorescent protein, such as Dreiklang or RSFP, and can facilitate generation of the chemiluminescence to increase the intensity of the light emitted from the fluorescent protein when irradiated with first control light. On the other hand, the decoupled chemiluminescence substance, when irradiated with second control light different from the first control light, can suppress generation of the chemiluminescence to lower the intensity of the light emitted from the fluorescent protein.

Figure 6B:
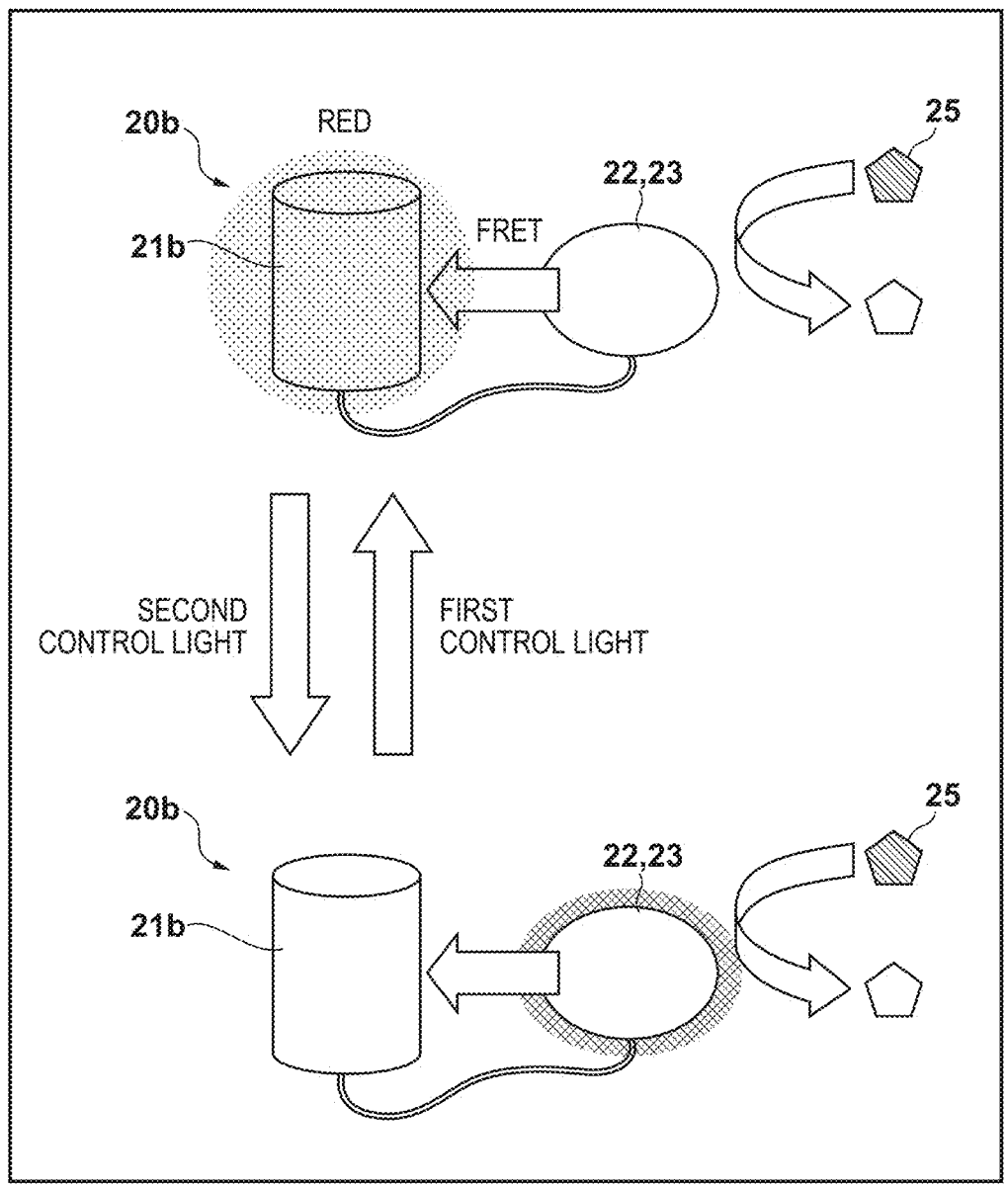
FIG. 6B describes a decoupled chemiluminescence substance.

FIG. 6B shows a decoupled chemiluminescence substance 20b. FIG. 6B shows the luminescence enzyme 22 and the luminescence control portion 23 as a combined unit. When the decoupled chemiluminescence substance 20b is irradiated with the first control light (having a wavelength of 355 nm, for example), the luminescence enzyme 22 in the excited state undergoes Förster resonance energy transfer (FRET), which causes the energy of the luminescence enzyme 22 to move to a fluorescent protein 21b, so that generation of the chemiluminescence is facilitated, and the intensity of the light emitted from the fluorescent protein 21b can therefore be increased (upper part of FIG. 6B). On the other hand, when the decoupled chemiluminescence substance 20b is irradiated with second control light (having a wavelength of 405 nm, for example), generation of the chemiluminescence is suppressed, to lower the intensity of the light emitted from the fluorescent protein 21b (lower part of FIG. 6B).

A description will next be given of a case where a biological specimen containing a decoupled chemiluminescence substance is observed under the microscopes shown in Examples 1 and 2 described above. To observe the biological specimen containing a decoupled chemiluminescence substance, the defining unit 4 of each of the microscopes defines the radiation patterns of the first control light and the second control light with which the observation surface of the biological specimen 7 is irradiated in such a way that a first area where the chemiluminescence from the chemiluminescence substance is to be detected is irradiated with the first control light and a second area that surrounds the first area is irradiated with the second control light. For example, the first control light is converted by the defining unit 4 into dot-shaped light with which only the first area is irradiated, and the second control light is converted by the defining unit 4 into donut-shaped light with which only the second area, which surrounds the first area, is irradiated. The contrast of the luminescence intensity between the first area and the second area can thus be increased, whereby the chemiluminescence from the first area can be detected with increased sensitivity.

Fourth Embodiment

Figure 7:
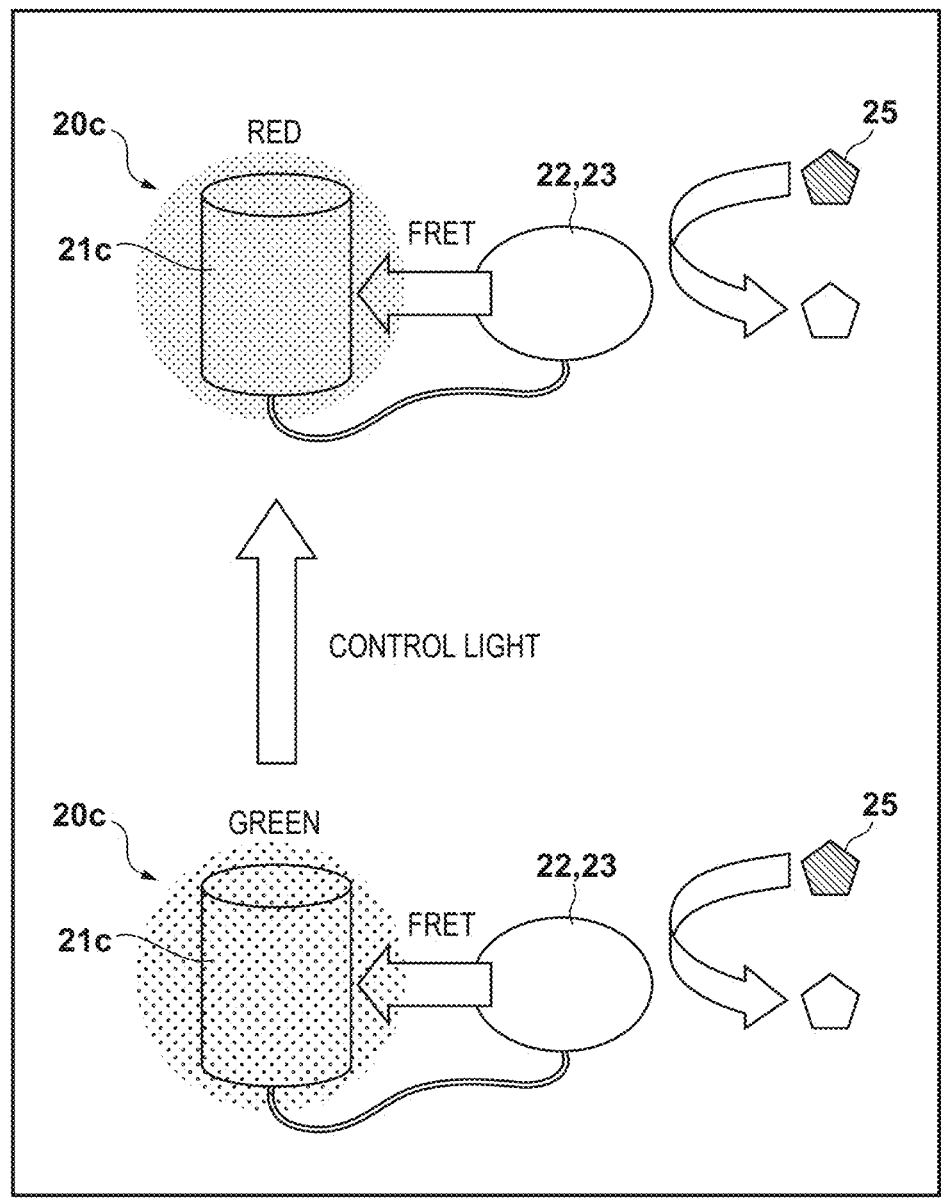
FIG. 7 describes a light-conversion chemiluminescence substance.

In a fourth embodiment, a description will be given of a case where a biological specimen contains what is called a light-conversion chemiluminescence substance, which generates chemiluminescence having a wavelength (color of emitted light) that changes when irradiated with the control light. A light-conversion chemiluminescence substance contains a fluorescent protein, such as Kaede, KikGR, PS-CFP1, mEOS2, mEOS3.2, or PSmOrange, and the wavelength of the chemiluminescence changes from a first wavelength to a second wavelength when the light-conversion chemiluminescence substance is irradiated with the control light. FIG. 7 shows a light-conversion chemiluminescence substance 20c. FIG. 7 shows the luminescence enzyme 22 and the luminescence control portion 23 as a combined unit. Before the light-conversion chemiluminescence substance 20c is irradiated with the control light (lower part of FIG. 7), the wavelength of the chemiluminescence is the first wavelength (green light, for example), whereas when the light-conversion chemiluminescence substance 20c is irradiated with the control light, the wavelength of the chemiluminescence can be changed from the first wavelength to the second wavelength (red light, for example).

A description will next be given of a case where a biological specimen containing a light-conversion chemiluminescence substance is observed under the microscopes shown in Examples 1 and 2 described above. To observe the biological specimen 7 containing a light-conversion chemiluminescence substance, the defining unit 4 of each of the microscopes defines the radiation pattern of the control light with which the observation surface of the biological specimen 7 is irradiated in such a way that the area (first area) where the chemiluminescence is to be detected is irradiated with the control light. For example, the control light is converted by the defining unit 4 into dot-shaped light with which only the first area is irradiated. The detector 13 then detects the chemiluminescence (second wavelength) from the biological specimen 7 via a filter that does not transmit the light having the first wavelength but transmits the light having the second wavelength. The contrast of the luminescence intensity between the area where the chemiluminescence having the second wavelength is generated and the other area where the chemiluminescence having the first wavelength is generated can thus be increased, whereby the chemiluminescence from the area can be detected with increased sensitivity.

In the example described above, the chemiluminescence having the second wavelength is detected. Instead, the chemiluminescence having the first wavelength may be detected. In this case, the defining unit 4 defines the radiation pattern of the control light with which the observation surface of the biological specimen 7 is irradiated in such a way that the first area where the chemiluminescence is to be detected is not irradiated with the control light but the second area, which surrounds the first area, is irradiated with the control light. The detector 13 then detects the chemiluminescence (first wavelength) from the biological specimen 7 via a filter that does not transmit the light having the second wavelength but transmits the light having the first wavelength. The contrast of the luminescence intensity between the first area where the chemiluminescence having the first wavelength is generated and the second area where the chemiluminescence having the second wavelength is generated can thus be increased, whereby the chemiluminescence from the first area can be detected with increased sensitivity.

Fifth Embodiment

In a fifth embodiment, a description will be given of another method for observing a biological specimen by using the microscopes shown in Examples 1 and 2 described above. A biological specimen contains a variety of pieces of information ranging from low-frequency information (coarse structure information) to high-frequency information (fine structure information), and it is therefore difficult for a microscope of the related art to obtain the high-frequency information due to the resolution limit (diffraction limit). To overcome the difficulty, in the present embodiment, the observation surface of a biological specimen is irradiated with the control light having a known radiation pattern (first pattern), and an interference pattern (second pattern (a moiré pattern, for example)) formed on the observation surface by mutual interference (mutual effect) between the frequency component of the biological specimen and the frequency component of the radiation pattern of the control light is detected with the detector 13. The frequency component of the biological specimen is then determined by the processing unit 16 based on the frequency component of the radiation pattern of the control light and the frequency component of the interference pattern detected with the detector 13. That is, when the biological specimen is irradiated with the control light having the known radiation pattern, the frequency component of the biological specimen can be shifted toward the low-frequency side and detected as an interference pattern (moiré pattern), whereby the high-frequency information on the biological specimen that cannot be observed under a microscope of the related art can also be observed as well as the low-frequency information.

Figure 8:
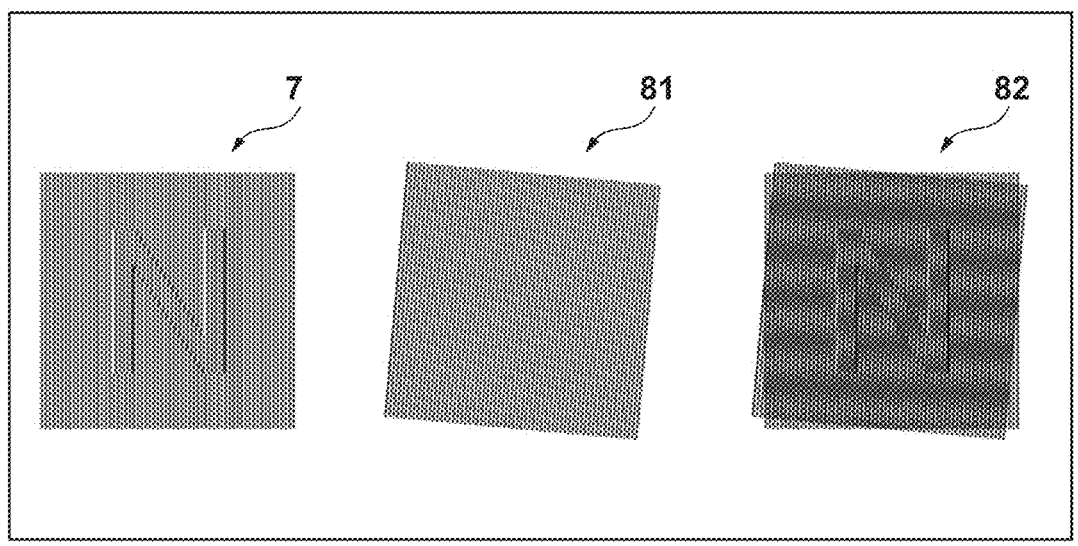
FIG. 8 shows an example in which an observation surface of a biological specimen is irradiated with control light.

FIG. 8 shows a case where the observation surface of the biological specimen 7 is irradiated with the control light having a known striped radiation pattern 81. The radiation pattern 81 of the control light is defined by a spatial modulator, such as Liquid Crystals on Silicon (LCoS) and a digital mirror device (DMD), provided in the defining unit 4. The spatial modulator is preferably so provided to be attachable to and detachable from the microscope (defining unit 4).

When the observation surface of the biological specimen 7 is irradiated with the control light having the known striped radiation pattern 81, and in a case where the biological specimen contains a positive chemiluminescence substance, the chemiluminescence is suppressed in the portion irradiated with the control light, whereas the chemiluminescence remains allowed in the portion irradiated with no control light. As a result, a moiré pattern 82 (interference pattern) is formed on the observation surface by the mutual interference between the frequency component of the biological specimen 7 and the frequency component of the radiation pattern 81 of the control light. The moiré pattern 82 is detected with the detector 13, and the processing unit 16 removes the frequency component of the radiation pattern 82 of the control light from the frequency component of the moiré pattern 82 detected with the detector 13. The frequency component of the biological specimen 7 can therefore be obtained even for a high-frequency component (high-frequency information) difficult to observe under a microscope of the related art. That is, the high-frequency information on the biological specimen 7 that cannot be observed under a microscope of the related art can be observed in the form of super-resolution chemiluminescence observation.

In the example shown in FIG. 8, the radiation pattern 81 of the control light is a line-and-space pattern having linear irradiation areas and non-irradiation areas alternately and periodically arranged, but this is not necessarily the case, and any pattern having a frequency component that interacts with the frequency component of the biological specimen 7 may be used. Further, to produce a two-dimensional image of the biological specimen 7, the biological specimen 7 may be irradiated with 3-direction-by-3-phase types of patterned light for acquisition of nine images in total, and the frequency components of the biological specimen 7 obtained from 3-direction-by-3-phase images is preferably combined with (added to) one another.

The present invention is not limited to the above embodiments, and various changes and modifications can be made within the spirit and scope of the present invention. Therefore, to apprise the public of the scope of the present invention, the following claims are made.

The invention claimed is:

1. A method for observing a biological specimen in a living state, wherein the method comprises:
   adding a luminescence substrate to the biological specimen, wherein:
     the luminescence substrate includes a self-luminous fused protein that contains a luminescence enzyme and a fluorescent protein, and
     the self-luminous fused protein generates light by chemiluminescence;
   illuminating the biological specimen with a radiation pattern of a control light that changes a state of the chemiluminescence, wherein the radiation pattern has a defined shape; and
   detecting a light emitted from the biological specimen by chemiluminescence, wherein:
   when illuminating an observation surface of the biological specimen with the control light, the shape of the control light is defined as a first pattern, and
   when detecting the light emitted from the biological specimen by chemiluminescence, a second pattern formed on the observation surface by a mutual effect between a frequency component of the biological specimen and a frequency component of the first pattern is detected, and the frequency component of the biological specimen is determined based on the frequency component of the first pattern and a frequency component of the second pattern.

2. The method according to claim 1, wherein
the change of the state of the chemiluminescence, when the biological specimen is irradiated with the control light, comprises: suppressing the generation of the light emitted by chemiluminescence when the biological specimen is irradiated with the control light; and
when illuminating an observation surface of the biological specimen with the control light, the shape of the control light is so defined that a first area, where the light emitted by chemiluminescence is to be detected, is not irradiated with the control light, and a second area that surrounds the first area is irradiated with the control light.

3. The method according to claim 1, wherein
the control light facilitates generation of the light emitted by chemiluminescence when the biological specimen is irradiated with the control light, and
when illuminating an observation surface of the biological specimen with the control light, the shape of the control light is so defined that a first area, where the light emitted by chemiluminescence is to be detected, is irradiated with the control light.

4. The method according to claim 1, wherein
the control light includes both a first control light that facilitates generation of the light emitted by chemiluminescence when the biological specimen is irradiated with the control light, and a second control light that suppresses generation of the light emitted by chemiluminescence when the biological specimen is irradiated with the control light, and
when illuminating an observation surface of the biological specimen with the control light, the shape of the first control light and the shape of the second control light are so defined that a first area where the chemiluminescence is to be detected is irradiated with the first control light and a second area that surrounds the first area is irradiated with the second control light.

5. The method according to claim 1, wherein
the control light changes a wavelength of the light emitted by chemiluminescence from a first wavelength to a second wavelength when the biological specimen is irradiated with the control light,
when illuminating an observation surface of the biological specimen with the control light, the shape of the control light is so defined that a first area where the chemiluminescence is to be detected is irradiated with the control light, and
when detecting the light emitted from the biological specimen by chemiluminescence, the light emitted by chemiluminescence from the biological specimen is detected via a filter that does not transmit light having the first wavelength but transmits light having the second wavelength.

6. The method according to claim 1, wherein the method further comprises:
changing a position of the biological specimen in a direction perpendicular to an optical path of the control light; and
after the changing of the a position of the biological specimen, repeating the illuminating of the biological specimen with the control light and detecting the light emitted from the biological specimen by chemiluminescence, in this order.

7. The method according to claim 2, wherein when illuminating the biological specimen with the control light, the shape of the control light is defined in such a way that a plurality of first areas are formed on the observation surface.

8. The method according to claim 1, wherein
the first pattern includes a striped pattern, and
the second pattern includes a moiré pattern produced by mutual interference between the frequency component of the biological specimen and the frequency component of the first pattern.

9. The method according to claim 1, wherein the control light has an intensity of 1 $W/cm^2$ or lower.

10. The method according to claim 1, wherein the substrate includes a luminescence control portion that contains a light-oxygen-voltage-sensing domain 2 (LOV2 domain) of Phototropin, LOV2-1427V, which is a variant of the LOV2 domain, an AppA domain (1-133) of a BLUF protein, a PapB domain (1-147) of the BLUF protein, or a YcgF domain (1-97) of the BLUF protein.

11. The method according to claim 1, wherein the self-luminous fused protein includes at least one of a yellow Nano-lantern, a cyan Nano-lantern, an orange Nano-lantern, a green Nano-lantern, and a red Nano-lantern.

12. The method according to claim 1, wherein the control light has a wavelength ranging from 380 to 480 nm in a one-photon absorption scheme or a wavelength ranging from 850 to 940 nm in a two-photon absorption scheme.

13. The method according to claim 1, wherein
the luminescence substrate contains a plurality of types of chemiluminescence substances that generate a plurality of chemiluminescence phenomena different from one another in terms of wavelength, and
when detecting a light emitted from the biological specimen by chemiluminescence, the plurality of chemiluminescence phenomena are detected.

* * * * *